Feb. 26, 1929. 1,703,300
T. A. DANIEL
EXTRUSION PRESS
Filed June 8, 1927 2 Sheets-Sheet 1
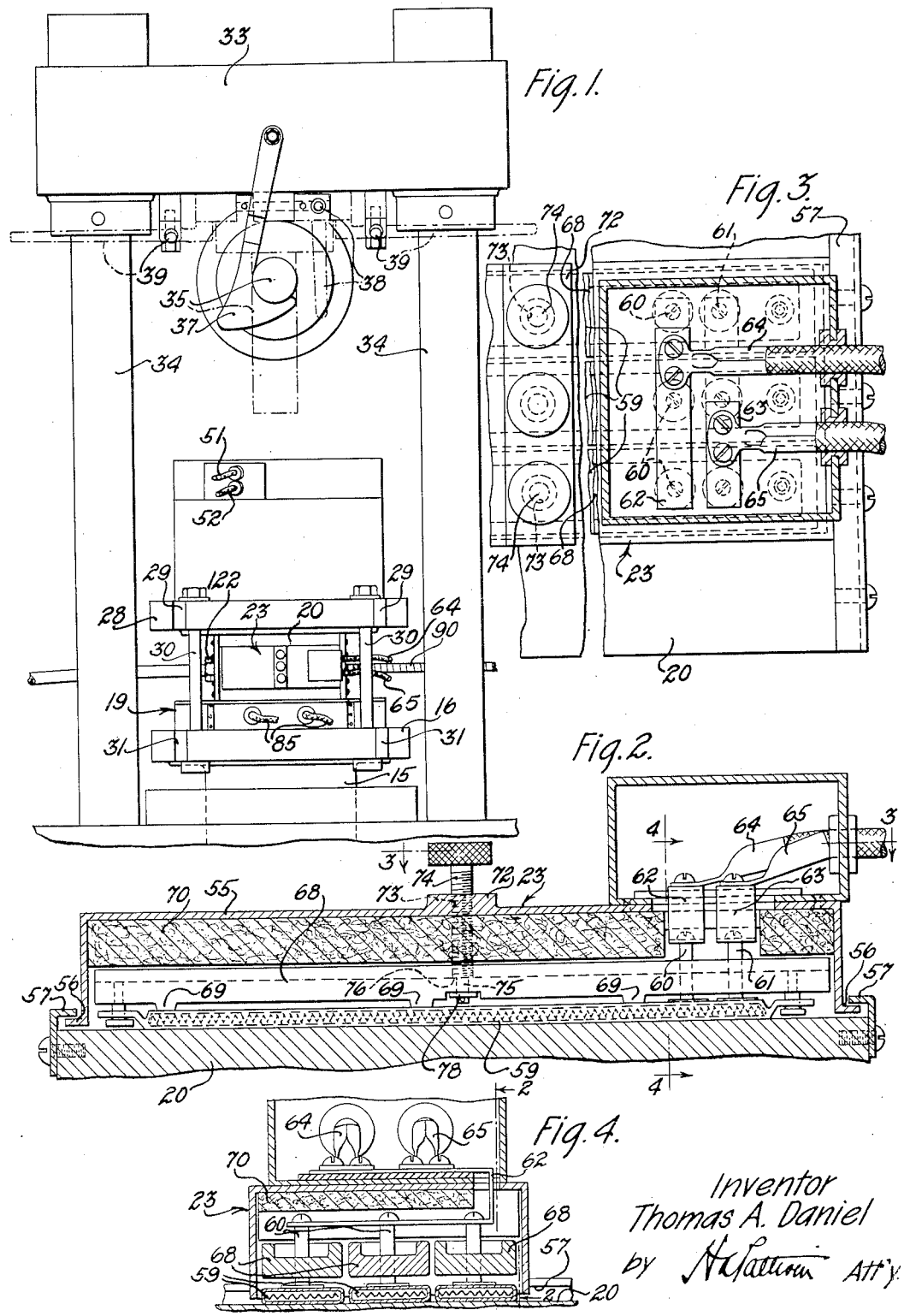
Inventor
Thomas A. Daniel
by N. Sattur Att'y Feb. 26, 1929.
T. A. DANIEL
1,703,300
EXTRUSION PRESS
Filed June 8, 1927  2 Sheets-Sheet 2
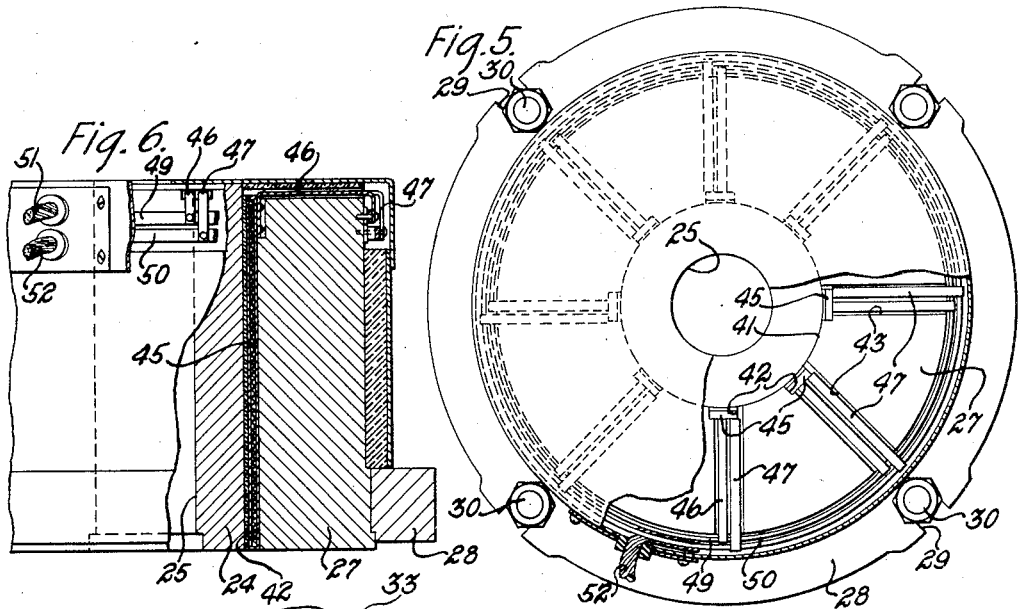
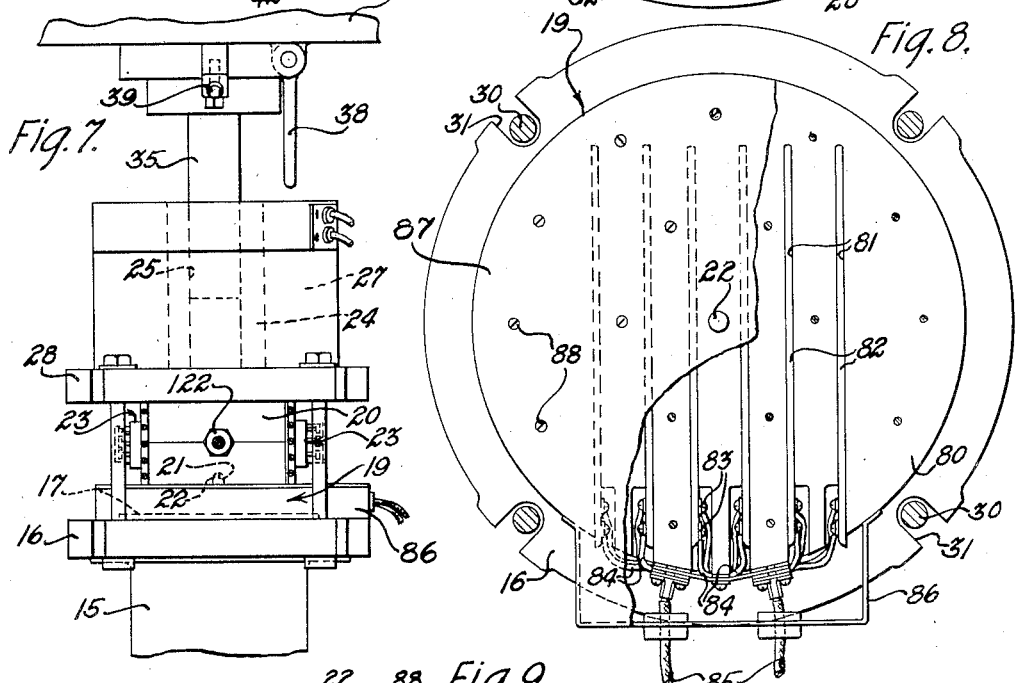
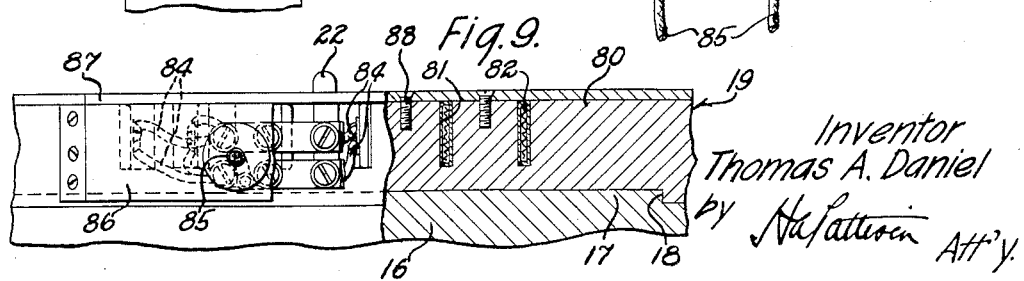
Inventor
Thomas A. Daniel
by [signature] Att'y.

Patented Feb. 26, 1929.

1,703,300

UNITED STATES PATENT OFFICE.

THOMAS ARCHIE DANIEL, OF MAYWOOD, ILLINOIS, ASSIGNOR TO WESTERN ELECTRIC COMPANY, INCORPORATED, OF NEW YORK, N. Y., A CORPORATION OF NEW YORK.

EXTRUSION PRESS.

Application filed June 8, 1927. Serial No. 197,270.

This invention relates to extrusion presses, and more particularly to electrically heated extrusion presses.

The object of the invention is to provide an electrically heated press for extruding articles, such as cable sheaths, from cast units of lead or other metals in which the temperature of the metal being extruded may be readily and accurately maintained at the proper extrusion temperature.

In accordance with the general features of the invention there is provided an extrusion cylinder designed to receive heated slugs or other cast units of metal, above which is mounted a plunger for forcing the metal from the cylinder through a die provided in a die block mounted below the cylinder. The cylinder and the die block are rigidly secured upon a ram which is raised by hydraulic means to cause the plunger to enter the cylinder. Surrounding the extrusion cylinder and concentric therewith is another cylinder which is provided with a plurality of vertical recesses in each of which is mounted an electric heating unit all of which units are connected to bus bars encircling the outer cylinder and connected to suitable conductors leading to a source of electrical energy. Boxes containing electric heating units are adjustably secured to opposite sides of the die block to maintain the die at the proper temperature for extrusion and a heating plate is interposed between the die block and the ram to compensate for the heat lost by conduction through the ram.

Other objects and features of the invention will be apparent from the following detailed description of one embodiment thereof taken in connection with the accompanying drawings, in which Fig. 1 is a side elevation of an extrusion press embodying the invention;

Fig. 2 is an enlarged sectional view of a heating means forming a part thereof, which section is taken on line 2—2 of Fig. 4;

Fig. 3 is a sectional view of the heating means taken on line 3—3 of Fig. 2;

Fig. 4 is another sectional view of the heating means taken on line 4—4 of Fig. 2;

Fig. 5 is a plan view, partly broken away, of an extruding cylinder and associated members forming a part of the extrusion press;

Fig. 6 is a vertical elevation partly in section of the last named parts;

Fig. 7 is a fragmentary front elevation of the extrusion press showing the parts in operative position;

Fig. 8 is a plan view partly broken away of a heating plate constituting a part of the press, and Fig. 9 is an elevation partly in section of the heating plate.

Although a press embodying the invention may be employed to extrude various articles the embodiment illustrated by the drawings is adapted to extrude a metal sheath around an electric cable. Referring to the drawings in which like numerals designate like parts throughout the several views, the numeral 15 indicates a ram which may be raised or lowered by a hydraulic means (not shown). Upon the upper end of the ram 15 is secured a table 16 provided with a circular raised portion 17 which enters a depression 18, Fig. 9, formed in the bottom of a heating plate 19 positioned upon the table 16. Directly above the heating plate 19 is a die block 20 provided with a central aperture 21 into which extends a post 22 protruding from the upper side of the heating plate 19. The die block 20 is provided with a die 122 through which extruded material is forced, while upon the sides of the die block 20 boxes 23—23 containing electrical heating units are adjustably secured.

Directly above the die block 20 is an extrusion cylinder 24 provided with a central cylindrical aperture 25 which communicates with an opening in the die block 20 (not shown) leading to the die 122. The extrusion cylinder 24 is surrounded by an outer cylinder 27 having a flange 28 formed on the bottom thereof, which flange has slots 29—29 formed therein into which long bolts 30—30 which enter similar slots 31—31 in the table 16 are inserted for the purpose of rigidly securing the heating plate, the die block, and the extrusion cylinder upon the ram 15.

A cap 33 is secured in spaced relation to the parts hereinbefore described by means of posts 34—34 upon which cap is pivotally mounted a plunger 35 designed to enter the aperture 25 in the extrusion cylinder 24 to force metal to be extruded from within the cylinder 24 through the die 122. In its inoperative position, the plunger 35 is suspended as shown in full lines in Fig. 1 by means of a latch 37 pivotally mounted upon the cap 33. The plunger 35 may be swung by means of a lever 38 from its inoperative position, as shown in full lines in Fig. 1, to its operative position, as shown in dotted lines in Fig. 1 and in full lines in Fig. 7, where it may be secured by means of latches 39—39 which are pivoted to swing in horizontal planes upon the cap 33.

The cylinder 27 which surrounds the extrusion cylinder 24 is provided with a central circular aperture 41 (Fig. 5) which is concentric with the outer periphery of the extrusion cylinder 24 and in close proximity thereto. Upon the inner surface of the central aperture 41 are formed a plurality of equally spaced, vertical recesses 42—42, while in the top surface of the cylinder 27 are formed a plurality of radial grooves 43—43 each of which extends from one of the vertical recesses 42 to the outer periphery of the cylinder 27. A heating unit 45 is positioned in each of the recesses 42—42 and conductors 46—46 and 47—47 made of a heat resistant material such as "Monel" metal extend from terminals formed upon the upper ends of the heating units 45—45 through the grooves 43—43 to bus bars 49 and 50 encircling the cylinder 27 to which are connected conductors 51 and 52 leading to a source of electrical energy (not shown).

Each of the boxes 23—23 adjustably secured to the die block 20 comprises a casing 55 (Figs. 2, 3 and 4) provided at each end with outwardly extending flanges 56—56 which coact with flanges 57—57 upon the die block 20. Within the casing 55 are positioned a plurality of heating units 59—59 of any suitable type, each of which is provided with terminals 60—60 and 61—61 near one end thereof, which terminals are connected by means of strips of heat resistant, conducting material 62 and 63 to electrical conductors 64 and 65, in the manner clearly shown in Figs. 2, 3 and 4 which conductors lead to a source of electrical energy (not shown). Within the casing 55 and closely adjacent each of the heating units 59—59 is located a pressure block 68 having a plurality of depending pressure ribs 69—69 formed upon the lower side thereof for engagement with the heating units 59—59. A block 70 of an insulating material is positioned between the pressure blocks 68—68 and the top of the casing 55 to insulate the casing from the heat generated by the heating units 59—59. The casing 55 has an outwardly extending ridge 72 formed thereon which is provided with a plurality of screw threaded holes 73—73 in each of which is threaded a screw 74 which extends through apertures in the block 70 and cooperates with a pressure block 68 to impart motion to the latter. The end of each of the screws 74 is provided with an unthreaded circular portion 75 of smaller diameter than the remainder of the screw, thereby forming a shoulder 76 near the end thereof. The small, unthreaded portion 75 of each of the screws 74 is insered through an opening in the pressure block 68 so that the shoulder 76 is in contact with the outer surface of the pressure block and each of the screws 74 is maintained in position with respect to the pressure blocks 58—58 by means of collars 78—78.

When the screws 74—74 are turned in one direction the shoulders 76—76 force the pressure blocks 68—68 toward the heating units 59—59 causing the ribs 69—69 on the pressure blocks to bear against the heating units and to force them tightly against the die block 20. At the same time the force exerted against the die block tends to force the casings 55 away from the die block, and as a result the flanges 56—56 on the casings are forced against the flanges 57—57 on the die block thereby holding the boxes 23—23 in the desired position. When the screws 74—74 are turned in the opposite direction the heating boxes 23—23 may be moved along the die block to any position at which it is desired to localize the heat generated thereby.

The heating plate 19 comprises a circular element 80 (Figs. 8 and 9) in which are formed a plurality of grooves 81—81 in each of which is positioned a heating unit 82—82. The heating units are provided at their outer end with terminals 83—83 which are connected by suitable heat resistant conductors 84—84 to conductor cords 85—85 which lead from a source of electrical energy to the conductors 84—84 within a terminal box 86 secured to the element 80. A cover plate 87 having a contour conforming to that of the element 80 and the terminal box 86 is secured upon the element 80 by means of screws 88—88.

The operation of the press is as follows: The end of a cable core 90 upon which it is desired to extrude a sheath of a metal such as a lead alloy is inserted through the opening through the die block 20 and allowed to extend a short distance through the die 122 and the circuits connected to the conductors 51 and 52, 64 and 65, and 85—85 are closed to supply electrical energy to the heating units with which they are associated. The ram 15 is lowered into the position shown in Fig. 1, the plunger 35 is swung into inoperative position, as shown in full lines in Fig. 1 in order to provide sufficient room to insert a metal slug within the extrusion cylinder, and a slug of the metal to be extruded which has previously been heated to the temperature at which extrusion thereof may be accomplished, is inserted within the aperture 25 in the extrusion cylinder 24. The plunger 35 is then swung into operative position as shown in dotted lines in Fig. 1 and full lines in Fig. 7 by means of the lever 38 and is secured in this position by means of the latches 39—39. The ram 15 is then raised by the hydraulic means associated therewith, carrying the extrusion cylinder upwardly until the plunger 35 enters the central aperture 25 therein and forces the metal forming the metal slug which is maintained at the proper extrusion temperature by the heating units 42—42 from the extrusion cylinder 24 into the die block 20, around the cable 90, and through the die 122 to form a sheath around the cable. The end of the sheathed cable is secured to any suitable take-up device, such as a cable reel (not shown). The heating units 59—59 in the boxes 23—23 serve to maintain the die block uniformly heated at the desired temperature for the extrusion operation, and since the boxes 23—23 are adjustably secured upon the die block, they may be positioned at any points thereon at which it is desired to localize the heat generated by the units in the boxes. The heating plate 19 is positioned between the die block 20 and the cable 16 on the ram 15 to furnish sufficient heat to the die block to compensate for the heat lost by conduction through the ram 15.

What is claimed is:

1. In an extrusion press, an extrusion cylinder for receiving cast metal units, electrical heating means adjacent the cylinder for maintaining a unit in the cylinder at a desired temperature, a die block communicating with the extrusion cylinder, a die secured in the die block, electrical heating means adjustably secured to the die block, and an electrical heating plate positioned adjacent the die block, the adjustable heating means and the heating plate serving to maintain the die uniformly heated at a desired temperature.

2. In an extrusion press, an electrically heated extrusion cylinder provided with an aperture for receiving heated metal slugs, a die block having an opening therein communicating with the aperture in the cylinder, a die secured in the opening in the die block, electrical heating means adjustably secured upon opposite sides of the die block, a plunger designed to enter the aperture in said cylinder, a ram for causing relative movement between the cylinder and the plunger, and an electrical heating plate positioned between the ram and the die block to compensate for heat lost by conduction through the ram.

3. In an extrusion press, an extrusion cylinder for receiving heated cast metal units, a second cylinder surrounding the extrusion cylinder provided with a plurality of recesses adjacent the extrusion cylinder, an electrical heating unit in each of the recesses, and means for connecting the heating units to a source of electrical energy whereby when the heating units are energized the metal unit in the extrusion chamber is maintained at the proper extrusion temperature.

4. In an extrusion press, an extrusion cylinder for receiving heated metal units, a second cylinder surrounding the extrusion cylinder and concentric therewith, said second cylinder provided with a plurality of vertical recesses adjacent the extrusion cylinder, an electrical heating unit in each of the recesses, and means for connecting the heating units to a source of electrical energy whereby when the heating units are energized the metal unit in the extrusion chamber is maintained at the proper extrusion temperature.

5. In an extrusion press, an extrusion cylinder for receiving heated cast metal units, a second cylinder concentric with the extrusion cylinder and surrounding the latter cylinder in close proximity thereto, said second cylinder provided with a plurality of vertical recesses formed in the inner surface thereof, an electrical heating unit in each of the recesses, conductors encircling the outer cylinder and connected to a source of electrical energy, and means for connecting the heating units to the conductors whereby when the heating units are energized the metal unit in the extrusion chamber is maintained at the proper extrusion temperature.

6. In an extrusion press, an extrusion cylinder having a central bore for receiving heated metal slugs, a second cylinder provided with a central circular aperture concentric with and closely encircling the extrusion cylinder, said second cylinder provided with a plurality of equally spaced vertical recesses formed in the wall of the central circular aperture therein and provided with radial grooves extending from the recesses to the outer periphery thereof, an electric heating unit in each of the recesses, and conductors secured to the heating units and extending through the radial grooves to a source of electrical energy whereby when the heating units are energized the metal slug in the extrusion chamber is maintained at the proper extrusion temperature.

7. In an extrusion press, an electrically heated cylinder for receiving heated metal slugs, a die block having a die mounted therein in communication with the cylinder, and heating means adjustably secured to the die block comprising a casing, heating units positioned in the casing, and common means for securing the heating means to the die block and for forcing the heating units into uniform contact with the die block.

8. In an extrusion press, a die block, electrical means for heating the die block, a ram for moving the die block, and an electrical heating plate interposed between the die block and the ram to compensate for heat lost by conduction through the ram.

9. In an extrusion press, a die block having flanges on edges thereof, heating means adjustably secured to the die block comprising a casing having flanges thereon for co-operating with those on the die block, heating units in the casing, and threaded means for forcing the flanges together to secure the heating means on the die block and for forcing the heating units into uniform contact with the die block.

10. In an extrusion press, an extrusion cylinder for receiving cast metal units; a second cylinder encircling the first cylinder and having heating units positioned therein adjacent the first cylinder, for maintaining a metal unit in the first mentioned cylinder at a desired temperature; a die block in communication with the extrusion cylinder; a die secured in the die block; heating means adjustably secured to the die block comprising, a casing, heating units mounted in the casing, and means for adjusting the relative position of the die block and the heating means mounted thereon; a ram for moving the die block; and an electrical heating means interposed between the die block and the ram to compensate for heat dissipated by conduction through the ram.

11. In an extrusion press; an extrusion cylinder having a central bore for receiving heated metal units; a second cylinder provided with a central circular aperture concentric with and closely encircling the extrusion cylinder, said second cylinder provided with a plurality of equally spaced vertical recesses formed in the wall of the central circular aperture therein and provided with radial grooves extending from the recesses to the outer periphery thereof; an electrical heating unit in each of the recesses; conductors secured to the heating units and extending through the radial grooves to a source of electrical energy whereby when the heating units are energized a metal unit in the extrusion cylinder is maintained at a proper extrusion temperature; a die block having a die mounted therein in communication with said first mentioned cylinder and having flanges on the edges thereof; heating means adjustably secured to the die block comprising, a casing having flanges thereon co-operating with the flanges on the die block, heating units in the casing, threaded means for forcing the flanges together to secure the heating means on the die block and for forcing the heating units into uniform contact with the die block; a ram for moving the die block; and an electrical heating plate interposed between the die block and the ram to compensate for heat dissipated by conduction through the ram.

In witness whereof, I hereunto subscribe my name this 31st day of May, A. D. 1927.

THOMAS ARCHIE DANIEL.